United States Patent
Proux et al.

(10) Patent No.: US 9,081,858 B2
(45) Date of Patent: Jul. 14, 2015

(54) METHOD AND SYSTEM FOR PROCESSING SEARCH QUERIES

(75) Inventors: Denys Proux, Eybens (FR); Claude Roux, Grenoble (FR)

(73) Assignee: XEROX CORPORATION, Norwalk, CT (US)

(*) Notice: Subject to any disclaimer, the term of this patent is extended or adjusted under 35 U.S.C. 154(b) by 86 days.

(21) Appl. No.: 13/454,189

(22) Filed: Apr. 24, 2012

(65) Prior Publication Data
US 2013/0282759 A1    Oct. 24, 2013

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
CPC .................. G06F 17/30864; G06F 17/30445; G06F 17/30545; G06F 17/3064; G06F 17/30657
USPC ......... 707/766, 767, 769, 771, 773, 774, 775, 707/777, 780, 999.002, E17.075, 66, 779, 707/764, 770
See application file for complete search history.

(56) References Cited

U.S. PATENT DOCUMENTS

| | | | |
|---|---|---|---|
| 8,037,051 B2* | 10/2011 | Franks et al. | 707/708 |
| 8,090,740 B2* | 1/2012 | Morris et al. | 707/769 |
| 8,156,135 B2* | 4/2012 | Chi et al. | 707/765 |
| 2008/0189268 A1* | 8/2008 | Au | 707/5 |
| 2008/0189591 A1* | 8/2008 | Lection | 715/202 |
| 2009/0070299 A1* | 3/2009 | Parikh et al. | 707/3 |
| 2009/0112805 A1* | 4/2009 | Garbow et al. | 707/3 |
| 2010/0312782 A1* | 12/2010 | Li et al. | 707/769 |
| 2012/0179540 A1* | 7/2012 | Michaels et al. | 705/14.49 |

* cited by examiner

*Primary Examiner* — Greta Robinson
(74) *Attorney, Agent, or Firm* — Jones Robb, PLLC (57) ABSTRACT

A method, a system, and a computer program product for processing search queries are disclosed. A first query pertaining to a primary theme is received. One or more secondary queries are then generated. Each of the one or more secondary queries is associated with a corresponding plausible secondary theme. The first query and the one or more secondary queries are then submitted to a search engine.

17 Claims, 9 Drawing Sheets

METHOD AND SYSTEM FOR PROCESSING SEARCH QUERIES

TECHNICAL FIELD

The presently disclosed embodiments are directed to processing of search queries. More particularly, the presently disclosed embodiments are directed to a technique for submitting additional queries along with actual queries to a search engine.

BACKGROUND

The Internet and more specifically search engines have gained popularity amongst Internet users. A user accesses the Internet for a variety of information needs including, but not limited to, accessing technical documentations, searching for scientific papers and patent prior art, and so forth. In order to search for these documentations, the user typically runs a number of search queries, composed of keywords, on various known search engines such as Google™ search, Microsoft Bing™, AOL® search, and so forth. In response, the search engine returns a list of results typically listed in the order of their relevancy to the search query. The user then clicks on the relevant web-links to view the desired results.

Furthermore, various commercial entities (e.g., corporations, research based companies, patent related companies, etc.) usually provide Internet access to one or more users (employees, staff, guests, clients etc.) from a single IP address. Thus, from a search engine point of view, the queries which are submitted by the users from a given corporation usually appear as a huge group of queries submitted from the single IP address. In other words, all the queries submitted by the employees of a company are gathered into a single set of queries received from the single IP address. Such a set of queries may be traced by a third party to extract intelligence that may lead to undesirable breach of confidentiality.

In view of the foregoing, there is a need for a technique to hide various topics or themes that a user is performing the search on.

SUMMARY

According to aspects illustrated herein, there is provided a method for processing queries. The method includes receiving a first query pertaining to a primary theme. One or more secondary queries are generated. Each of the one or more secondary queries is associated with a corresponding plausible secondary theme. The first query and the one or more secondary queries are then submitted to a search engine.

According to aspects illustrated herein, there is provided a system for processing queries. The system includes a proxy server and a theme server. The proxy server receives a first query pertaining to a primary theme. The theme server receives a request from the proxy server for generating one or more secondary queries. The theme server then generates the one or more secondary queries based on one or more plausible secondary themes of a plurality of plausible secondary themes and one or more keywords pertaining to the one or more plausible secondary themes. The theme server then sends the one or more secondary queries to the proxy server. Thereafter, the proxy server submits the first query and the one or more secondary queries to a search engine.

According to aspects illustrated herein, there is provided a method for generating secondary queries. The method includes receiving a request for generating one or more secondary queries. In response to the request, the one or more secondary queries are generated based on one or more plausible secondary themes and keywords pertaining to the one or more plausible secondary themes.

According to aspects illustrated herein, there is provided a theme server for generating secondary queries. The theme server includes a query generation module for generating, in response to a request, one or more secondary queries based one or more plausible secondary themes and keywords pertaining to the one or more plausible secondary themes.

According to aspects illustrated herein, there is provided a method for processing queries. The method includes receiving a first query pertaining to a primary theme. A request to generate one or more secondary queries associated with one or more plausible secondary themes is sent. The one or more secondary queries are obtained in response to the request. The first query and the one or more secondary queries are then submitted to a search engine.

According to aspects illustrated herein, there is provided a proxy server for processing queries. The proxy server includes a query communication module and a query submission module. The query communication module receives a first query pertaining to a primary theme and sends a request to generate one or more secondary queries associated with the one or more plausible secondary themes. In response to the request, the query communication module receives the one or more secondary queries. Thereafter, the query submission module submits the first query and the one or more secondary queries to a search engine.

According to aspects illustrated herein, there is provided a method for automatically processing one or more result pages. The method includes receiving the one or more result pages from a search engine in response to a query associated with a first theme. Each of the one or more result pages includes one or more web-links and a text associated with each of the one or more web-links. A result page is selected from the one or more result pages based on predefined criteria. One or more keywords are extracted from the text associated with each of the one or more web-links present in the selected result page. The extracted keywords are then compared with a vocabulary associated with the first theme. Thereafter, a set of web-links from the one or more web-links present in the selected result page are explored based on the comparison.

BRIEF DESCRIPTION OF DRAWINGS

The accompanying drawings, which are incorporated in, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Various embodiments will hereinafter be described in accordance with the appended drawings provided to illustrate and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed description given herein with respect to the figures is just for explanatory purposes as the method and the system extend beyond the described embodiments. For example, those skilled in the art will appreciate that, in light of the teachings presented, multiple alternate and suitable approaches can be realized, depending on the needs of a particular application, to implement the functionality of any detail described herein, beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment, although it may.

Figure 1:
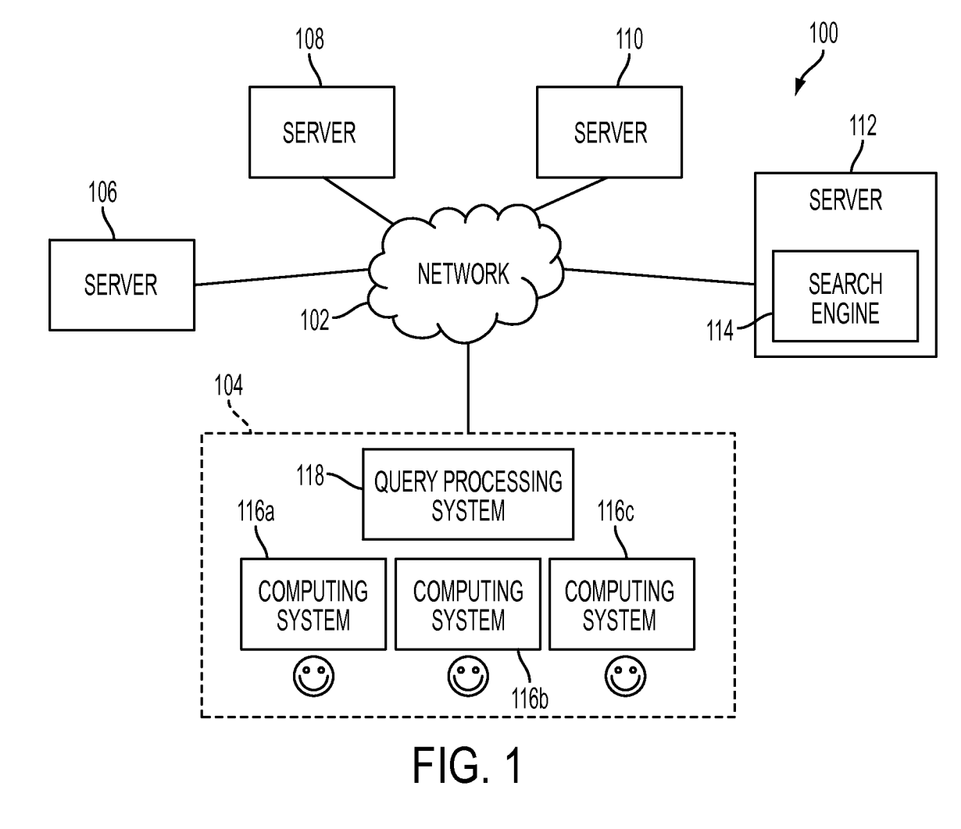
FIG. 1 is a block diagram illustrating an environment in which various embodiments can be implemented.

FIG. 1 is a block diagram illustrating an environment 100 in which various embodiments can be implemented. Environment 100 includes a network 102, an organization 104, and servers 106, 108, 110, and 112. The organization 104 includes one or more computing systems 116a, 116b, and 116c, and a query processing system 118. The server 112 hosts a search engine 114.

The network 102 interconnects the organization 104 and the servers 106, 108, 110, and 112. The network 102 is a medium through which various search queries, and content, such as result pages, etc, flow between the organization 104 and the servers 106, 108, 110, and 112. Examples of the network 102 may include, but are not limited to, LAN, WLAN, MAN, WAN, and the Internet. Communication over the network 102 may be performed in accordance with various communication protocols such as Transmission Control Protocol and Internet Protocol (TCP/IP), User Datagram Protocol (UDP) and IEEE 802.11n communication protocols.

Each of the servers 106, 108, and 110 may host one or more websites. Each website can include one or more web pages. The servers 106, 108, and 110 capable of hosting the one or more websites are shown for the simplicity of the explanation. However, the ongoing description is not limited with respect to the number of servers. It should be clear that any number of servers can be present without departing from the scope of the ongoing description. The search engine 114 is capable of handling search queries from the organization 104. Various examples of the search engine 114 may include but are not limited to, Google™ search, Microsoft Bing™, AOL® search, and so forth.

The computing systems 116a, 116b, and 116c may be operated by respective users. Various examples of the computing systems 116a, 116b, and 116c include but are not limited to, a desktop computer, a laptop, a PDA, a smart phone, and so forth. In an embodiment, the computing systems 116a, 116b, and 116c may be connected in a local network. Various examples of the local network may include but, not are limited to, LAN, WLAN, Bluetooth®, Wi-Fi™, and so forth. The computing systems 116a, 116b, and 116c are shown for the simplicity of the explanation. However, the ongoing description is not limited with respect to the number of computing systems.

The computing systems 116a, 116b, and 116c enable users to perform a search on various themes or topics. In an embodiment, users can input various search queries into a search interface displayed on the display screen of a computing system, such as, the computing system 116a. In another embodiment, the computing system 116a is capable of recognizing the user's voice and provides a platform to the user for voice search. Further, the computing systems 116a, 116b, and 116c are capable of displaying search results retrieved in response to the search queries inputted by the users. In an embodiment, various themes searched by users are referred to as primary themes (e.g., true or actual themes). For example, the user operating the computing system 116a inputs a first query pertaining to a primary theme.

According to various embodiments, the term 'theme' relates to a topic, a matter, an idea, a subject, a field, a discipline, an issue, and so forth.

The query processing system 118 intercepts all data traffic between the computing systems (e.g., 116a, 116b, and 116c) and the network 102. The query processing system 118 generates secondary queries pertaining to various plausible (i.e., believable, valid, having an appearance of truth or reason, seemingly worthy of approval or acceptance, or worthy of confidence or trust) secondary themes along with user-submitted queries. The query processing system 118 then submits the user queries (e.g., the first query) and the secondary queries to the search engine 114. In an embodiment, the query processing system 118 generates the secondary queries such that, over a period time, an equal numbers of secondary queries are generated for each plausible secondary theme of a set of plausible secondary themes.

In an embodiment, the plausible secondary themes include fake themes and the one or more secondary queries include fake queries. Thus, fake themes are type of the plausible secondary themes and the fake queries are type of the one or more secondary queries. When the first query (e.g., a genuine, true, or real query) pertaining to the primary theme (e.g., true, actual, or real theme) is run by the user, the query processing system 118 generates some secondary queries (e.g., fake queries) pertaining to plausible secondary themes (e.g., plausible fake themes). Thereafter, the query processing system 118 submits the first query and the secondary queries to the search engine 114. Thus, the actual theme, which is explored by the user, is not correctly detected by any external statistical categorization technique as the real search theme (e.g., the primary theme) is hidden among the plausible fake themes (e.g., the plausible secondary themes). For example, an external statistical analysis on the queries originating from the organization 104 over a predefined period of time results in identifying clusters of queries where each cluster relates to a valid theme. However, some of the themes are fake ones. In an embodiment, an external statistical analyzer may reside at one or more of server 106, server 108, server 110, server 112, or within search engine 114. Accordingly, the external statistical analyzer may perform a statistical analysis on the queries submitted to search engine 114.

In an embodiment, the query processing system 118 can be implemented on a single computer system. In another embodiment, the query processing system 118 can be distributed over various computer systems in the local network. Further, various functionalities of the query processing system 118 are explained in detail in the description infra.

For the simplicity of the explanation, communication to and from the computing system 116a will be disclosed in the description infra. However, it should be clear that the same explanation can be applicable to the other computing systems 116b and 116c as well, without departing from the scope of the ongoing description.

Figure 2:
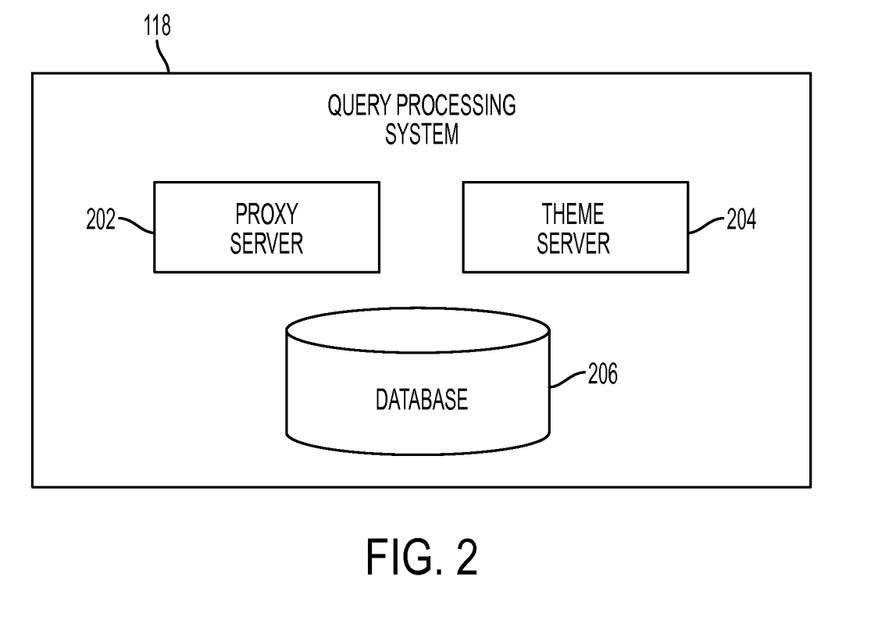
FIG. 2 is a block diagram illustrating a query processing system in accordance with an embodiment.

FIG. 2 is a block diagram illustrating the query processing system 118 in accordance with an embodiment. The query processing system 118 includes a proxy server 202, a theme server 204, and a database 206. The proxy server 202 functions in conjunction with the theme server 204 and the database 206.

In an embodiment, the proxy server 202, the theme server 204, and the database 206 can be implemented on a single computer system. In another embodiment, the proxy server 202, the theme server 204, and the database 206 can be distributed over one or more computer systems in the local network of the organization 104. In an embodiment, for example, the proxy server 202 and the theme server 204 can be implemented using various programming techniques (e.g., programming languages).

The proxy server 202 is a communication entity managing data exchange between the local network of the organization 104 and the network 102 (e.g., the Internet). It intercepts all communication (e.g., http code) between the local network of the organization 104 and the network 102 (e.g., Internet). In an embodiment, the proxy server 202 performs some action (e.g., filtering) on exchanged data. The proxy server 202 can keep a track of which computer sent some data on the Internet (e.g., attempt to access a given URL) and what content is retrieved (e.g., related web page content).

The theme server 204 uses various categorisation techniques to align input key words with a given theme using a predefined categorisation model. A more detailed explanation of the theme server 204 is provided in conjunction with FIG. 4.

The database 206 stores information including a list of plurality of plausible secondary themes and keywords pertaining to each of the plurality of plausible secondary themes. Further, the database 206 stores some additional information, such as, a list of the plurality of the primary themes, keywords pertaining to each of the plurality of the primary themes, or one or more named entities (e.g., user names) associated with the plurality of the primary themes and the plurality of plausible secondary themes. The additional information may further include a list of web-links related to the plurality of primary themes and the plurality of plausible secondary themes. The information stored in the database 206 may be dynamically updated.

In operation, in an embodiment, the computing system 116a receives a first query pertaining to a primary theme from a user. The computing system 116a then forwards the first query to the proxy server 202. For example, the user may input the first query pertaining to a theme of television screens (the primary theme).

In response to receiving the first query, the proxy server 202 sends a request to the theme server 204 for generating secondary queries. In an embodiment, the request includes the first query. In another embodiment, the request includes keywords extracted from the first query. In response to receiving the request, the theme server 204 analyses the request and generates the secondary queries pertaining to one or more plausible secondary themes. This is further explained in detail in conjunction with FIG. 3 and FIG. 4. Thereafter, the theme server 204 sends the secondary queries to the proxy server 202. The proxy server 202 then submits the first query and the secondary queries to the search engine 114.

In response, the search engine 114 returns result pages corresponding to each of the first query and the secondary queries to the proxy server 202. The proxy server 202 then identifies result pages corresponding to the first query and sends them to the computing system 116a. The proxy server 202 processes the result pages corresponding to the secondary queries. Further, the method of processing the result pages is explained in detail in conjunction with FIG. 7.

Figure 3:
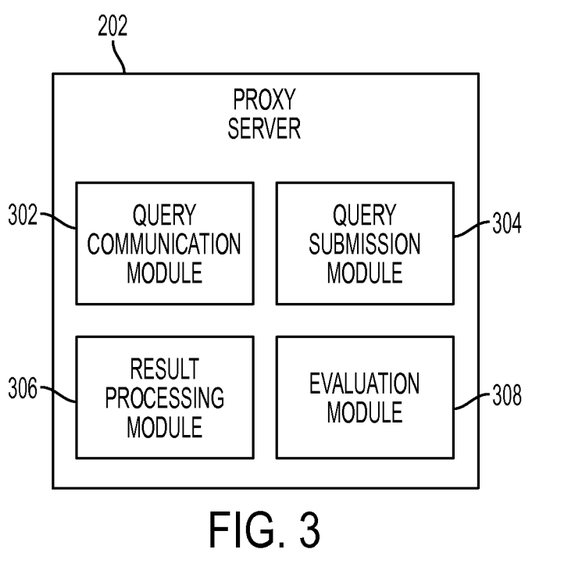
FIG. 3 is a block diagram illustrating a proxy server in accordance with an embodiment.

FIG. 3 is a block diagram illustrating the proxy server 202 in accordance with an embodiment. The proxy server 202 includes a query communication module 302, a query submission module 304, a result processing module 306, and an evaluation module 308. FIG. 3 will be explained in conjunction with FIG. 4.

Figure 4:
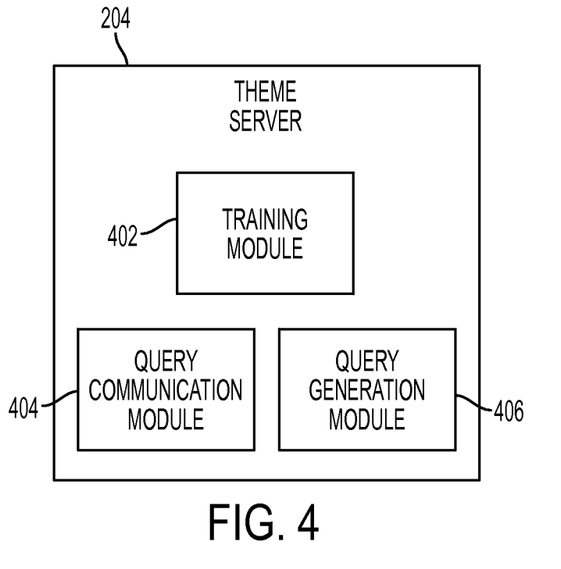
FIG. 4 is a block diagram illustrating a theme server in accordance with an embodiment.

FIG. 4 is a block diagram illustrating the theme server 204 in accordance with an embodiment. The theme server 204 includes a training module 402, a query communication module 404, and a query generation module 406.

The query communication module 302 receives the first query from the computing system 116a. The query communication module 302 then forms the request to be sent to the query communication module 404 of the theme server 204. As discussed in various embodiments supra, the request can be the first query or may include keywords extracted from the first query. The query communication module 404 forwards the request to the query generation module 406.

The query generation module 406 analyzes the request in order to identify the primary theme associated with the first query. In order to identify the primary theme, the query generation module 406 utilizes the categorization techniques implemented by the training module 402. In an embodiment, for example, a Probabilistic Latent Semantic Analysis (PLSA) technique is implemented by the training module 402. Further, it should be clear that any other suitable categorization technique can also be implemented. The categorization techniques are used to sort various documents (or texts) according to existing categories or discovering various categories from an unknown and unsorted set of documents. This will be further explained in the description infra. Thus, the query generation module 406 keeps a track of number of queries performed in a particular primary theme. Thereafter, the query generation module 406 selects one or more plausible secondary themes (other than the primary theme) from the database 206. In an embodiment, the number of plausible secondary themes (e.g., fake themes) to be selected can be fixed by an administrator of the query processing system 118. In another embodiment, the query generation module 406 randomly selects the one or more plausible secondary themes. For example, the query generation module 406 randomly selects a limited number (e.g., 2 to 4) of plausible secondary themes to avoid query over generation. In an embodiment, for example, the query generation module 406 may select various plausible secondary themes, such as, mobile communication, keyboards, printers, and so forth. The selected plausible secondary themes are different than the primary theme (e.g., television screens).

The query generation module 406 then selects one or more keywords associated with the selected one or more plausible secondary themes from the database 206. In an embodiment, the query generation module 406 selects a limited number (e.g., 1 to 5) of keywords to keep the amount of keywords in a typical range. However, any number of keywords can be selected without departing from the scope of the ongoing description. Thereafter, in an embodiment, the query generation module 406 forms a query (e.g., fake or false query) corresponding to each of the selected one or more plausible secondary themes based on the selected keywords. For example, the query generation module 406 generates one query for each of the selected plausible secondary themes (e.g., fake themes like mobile communication, keyboards, and printers). In another embodiment, the additional information stored in the database 206 can also be considered by the query generation module 406 to generate the secondary queries. Subsequently, the query generation module 406 sends the generated secondary queries to the proxy server 202. In an embodiment, the query communication module 302 receives the secondary queries. The query communication module 302 then forwards the secondary queries to the query submission module 304.

The query submission module 304 submits the secondary queries and the first query to the search engine 114. For example, the query submission module 304 submits a total of four queries, one pertaining to television screens (the primary theme), and three pertaining to mobile communication, keyboards, and printers (selected plausible secondary themes) to the search engine 114. In response to the received queries, the search engine 114 identifies result pages corresponding to each of the secondary queries and the first query.

The result processing module 306 receives the result pages corresponding to each of the secondary queries and the first query from the search engine 114. The result processing module 306 identifies the result pages corresponding to the first query and forwards them to the computing system 116a. Thereafter, the result processing module 306 processes the result pages corresponding to the secondary queries. For example, the result processing module 306 returns the result pages corresponding to the query pertaining to television screens to the computing system 116a. Thereafter, the result processing module 306 processes result pages corresponding to queries pertaining to mobile communication, keyboards, and printers. Further, the method for processing the result pages will be explained in detail in conjunction with FIG. 7.

The evaluation module 308, evaluates the queries submitted to the search engine 114 and web pages accessed over a predefined period of time. For example, the evaluation module 308 may be configured to evaluate the queries submitted to the search engine 114 and web pages accessed every 12-24 hours. Based on such evaluation, the evaluation module 308 enables the query communication module 302 to send a request to the theme server 204 for generating additional secondary queries. The method for generating the additional queries is further explained in detail in conjunction with FIG. 9.

The training module 402 facilitates the generation and maintenance of the database 206. In order to do so, the training module 402 implements the categorization techniques. In an embodiment, for a submitted document to be indexed (e.g., a web page), the training module 402 extracts the text content and performs an indexing of vocabulary to compare it with the keywords associated with existing themes (e.g., primary themes and plausible secondary themes) stored in the database 206. If the similarity score (based on the comparison) is very high (i.e., above a predefined threshold, for example, 0.75) for one specific theme "T", then the document is tagged as belonging to the theme "T" and it can be used to update a categorization model for the Theme "T". This means that the document will be added to the reference corpus used to train the training module 402. In an embodiment, natural language processing techniques can be used to detect and extract from the submitted document (or any other submitted texts) the named entities, hyperlinks (e.g., web-links) or bibliographical references that will be used to update the theme "T".

For a text (e.g., a query, a document, etc.) submitted by the proxy server 202, the training module 402 performs a word categorization using a standard categorization algorithm to compare it with the keywords associated with existing themes (e.g., the primary themes and the plausible secondary themes) to compute a similarity score. The highest similarity score indicates the closest theme. This theme is returned to the proxy server 202. In an embodiment, the submitted text corresponds to a list of keywords related to the first query. In another embodiment, the submitted text corresponds to a result title appearing in a result page. In yet another embodiment, the submitted text corresponds to longer text (e.g., one or more lines).

For a submitted web-link, the training module 402 looks for a similar web-link (e.g., main address) appearing in the list of web-links associated with each of its themes. If a match is found, then the corresponding theme is returned.

For a submitted named entity, the training module 402 looks for a similar named entity occurring in the database 206 containing named entities associated with each of the themes. If a match is found, then the theme is returned.

For a submitted theme, the training module 402 looks for a match in the database 206 for the list of themes (e.g., the primary themes and the plausible secondary themes). If there is a match, the training module 402 returns a Boolean value equal to TRUE if it is a primary theme.

Figure 5A:
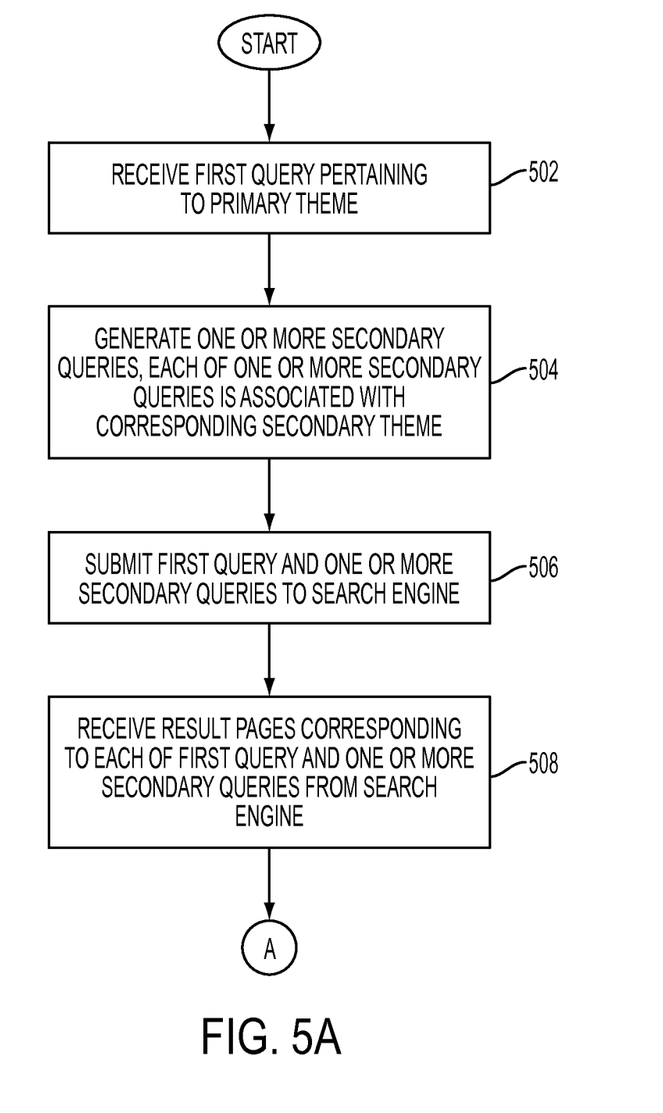
FIGS. 5a and 5b is a flow diagram illustrating a method for processing queries in accordance with an embodiment.
Figure 5B:
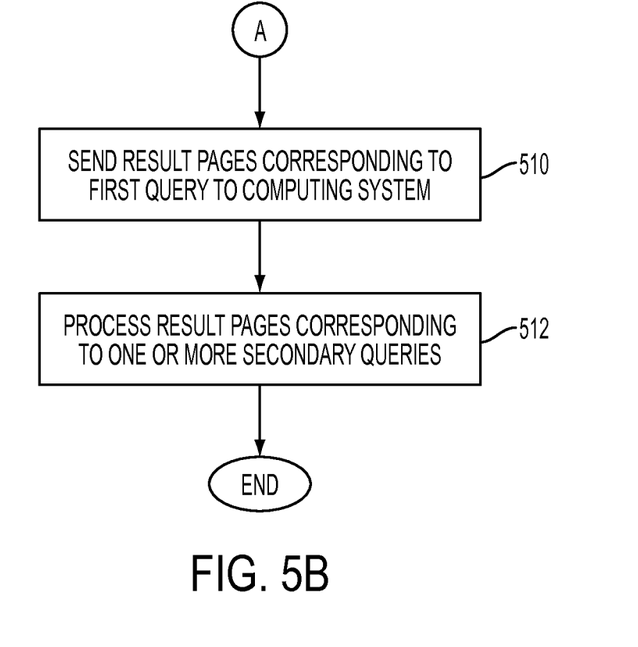

FIGS. 5a and 5b is a flow diagram illustrating a method for processing queries in accordance with an embodiment.

At step 502, the first query pertaining to the primary theme is received at the proxy server 202. In an embodiment, the first query is received by the query communication module 302 in the proxy server 202. The first query may include keywords pertaining to the primary theme. In an embodiment, the first query is sent from the computing system 116a.

At step 504, the one or more secondary queries are generated, where each of them are associated with the corresponding plausible secondary theme. In an embodiment, the one or more plausible secondary themes are generated by the theme server 204. This is further explained in detail in conjunction with FIG. 2, FIG. 3, and FIG. 4.

At step 506, the first query and the one or more secondary queries are submitted to the search engine 114. Once generated, the one or more secondary queries are sent to the proxy server 202 by the theme server 204. The proxy server 202 then submits the first query and the one or more secondary queries to the search engine 114. In an embodiment, the one or more secondary queries are submitted to the search engine 114 by the query submission module 304.

At step 508, result pages corresponding to each of the first query and the one or more secondary queries are received by the proxy server 202 from the search engine 114. In an embodiment, the result pages are received by the result processing module 306.

At step 510, the result pages corresponding to the first query are sent to the computing system 116a. The result pages corresponding to the first query are identified by the result processing module 306. The identified result pages are then returned to the computing system 116a from which the first query was sent.

At step 512, the result pages corresponding to the one or more secondary queries are processed by the proxy server 202. In an embodiment, the result pages corresponding to the one or more secondary queries are processed by the result processing module 306. Further, the method of processing the result pages is explained in detail in conjunction with FIG. 7.

Figure 6:
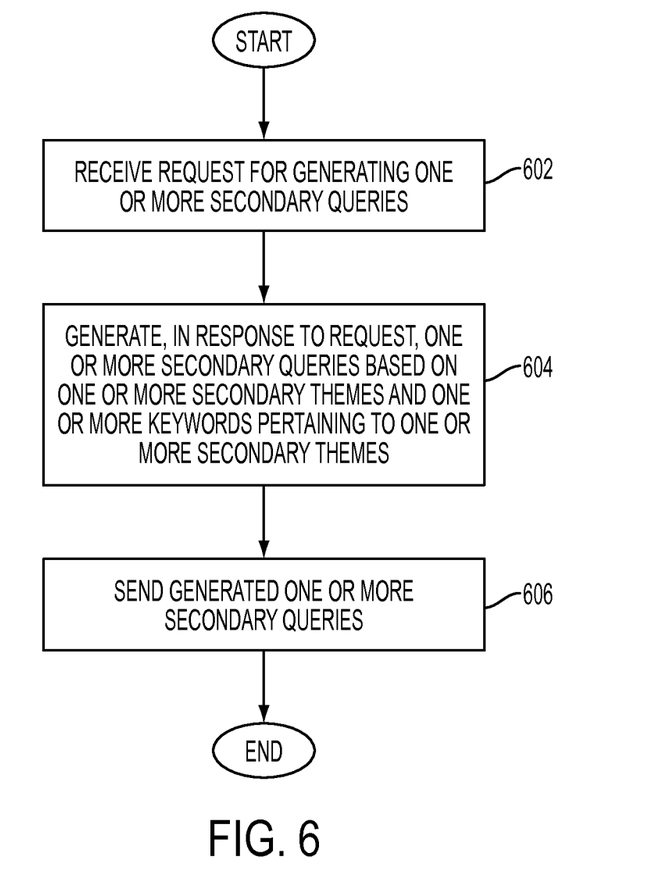
FIG. 6 is a flow diagram illustrating a method for generating secondary queries in accordance with an embodiment.

FIG. 6 is a flow diagram illustrating a method for generating secondary queries in accordance with an embodiment.

At step 602, the request for generating the one or more secondary queries is received by the theme server 204 from the proxy server 202. This is further explained in the description supra.

At step 604, in response to the request, the one or more secondary queries are generated by the theme server 204. The one or more secondary queries are generated based on the one or more plausible secondary themes, and the one or more keywords pertaining to the one or more plausible secondary themes. In an embodiment, the one or more secondary queries are generated by the query generation module 406. This is explained in detail in conjunction with FIG. 3 and FIG. 4.

Subsequently, in an embodiment, the generated one or more secondary queries are sent to the proxy server 202 from the theme server 204.

Figure 7:
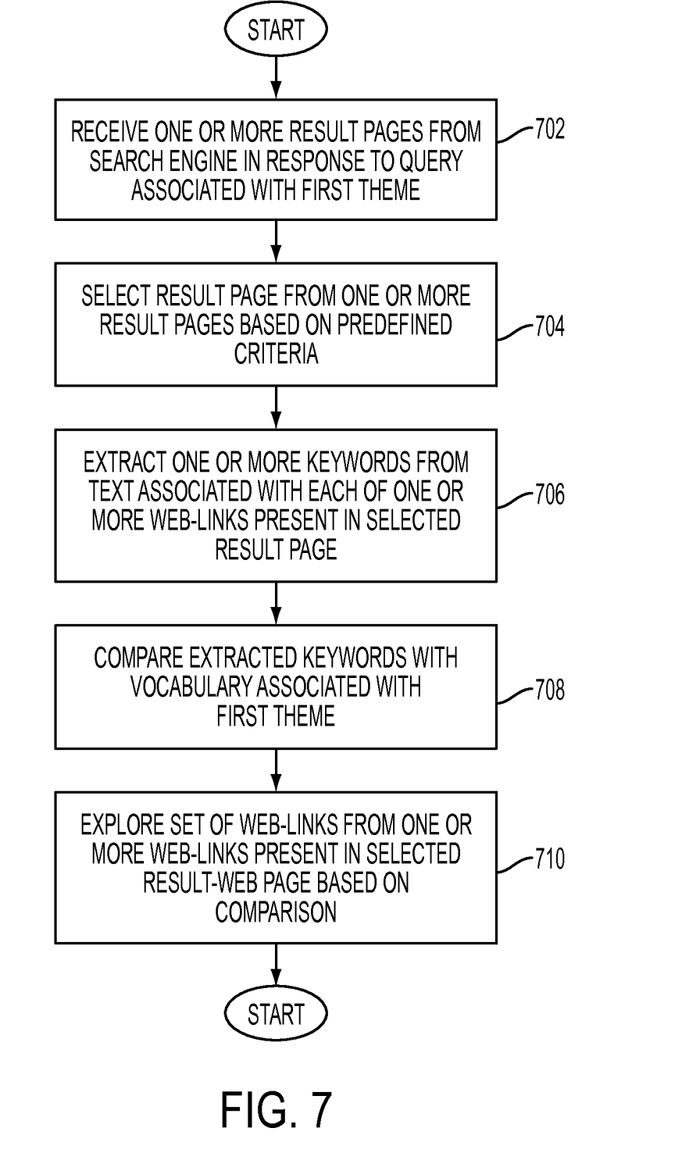
FIG. 7 is a flow diagram illustrating a method for processing result pages in accordance with an embodiment.

FIG. 7 is a flow diagram illustrating a method for processing result pages in accordance with an embodiment.

At step 702, one or more result pages are received from the search engine 114 in response to a query associated with a first theme. In an embodiment, one or more result pages corresponding to each secondary query are received at the proxy server 202 by the result processing module 306. Each result page may include one or more web-links and a text associated with each of the one or more web-links. For example, the result page may include web-links to identified results, titles associated with each result, and a short description or excerpts from the result.

At step 704, a result page is selected from the one or more result pages based on predefined criteria. In order to simulate human behavior, the result page is intelligently selected by the result processing module 306 from the one or more result pages based on the predefined criteria. In an embodiment, for example, according to the predefined criteria, in 90% of the cases, the $1^{st}$ result page is selected. In 9% of the cases, the $2^{nd}$ result page is selected. In 1% of the cases, the $3^{rd}$ result page is selected. It is understood by those skilled in the art that any other suitable criteria can also be applied to select the result page from the one or more result pages, without departing from the scope of the ongoing description.

In an embodiment, once the result page is selected, it is decided by the result processing module 306 whether to explore any web-link on the selected page. In an embodiment, for example, in 90% of cases, a web-link is selected. In 10% of the cases, no action will be performed. It is understood by those skilled in the art that any other appropriate criteria can be applied to make such a decision, without departing from the scope of the ongoing description.

At step 706, one or more keywords are extracted from the text associated with each of the one or more web-links present in the selected result page. As explained earlier, if it is decided to explore any web-link from the selected result page, the text associated with each of the one or more web-links present in the selected result page will be analyzed by the result processing module 306. The one or more keywords are then extracted. The extracted keywords are sent to the theme server 204.

At step 708, the extracted keywords are compared with a vocabulary associated with the first theme. The comparison may be performed by the theme server 204.

At step 710, a set of web-links are automatically explored by the result processing module 306 from the one or more web-links present in the selected result page based on the comparison. The results of the comparison are received at the result processing module 306 from the theme server 204. The set of web-links, for which the vocabulary of the text is closer to the vocabulary representing the first theme, is selected by the result processing module 306. The selected set of web-links is then automatically explored.

In an embodiment, a random web-link may be explored.

Figure 8:
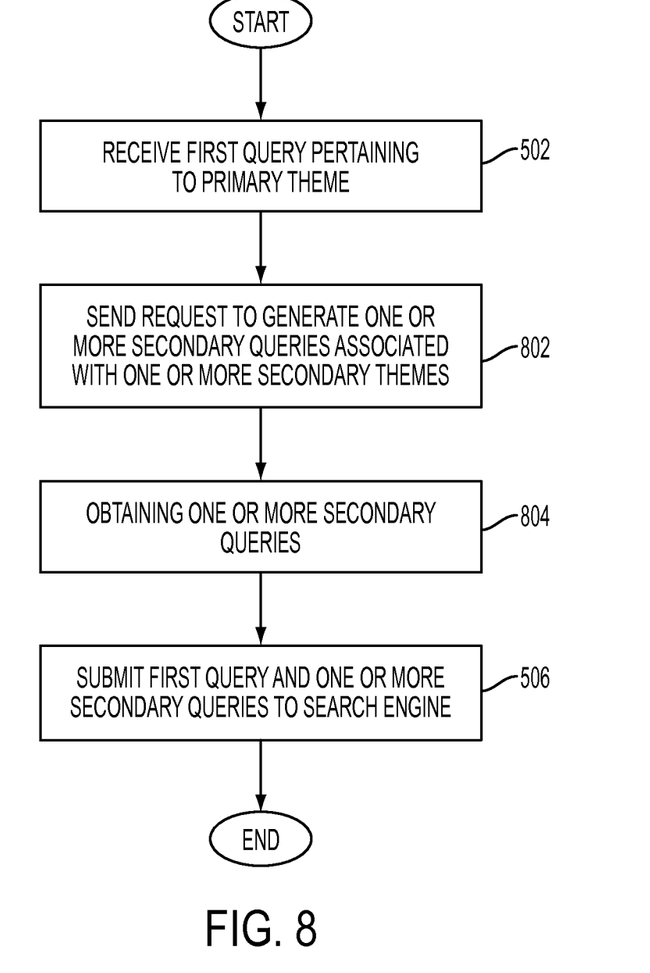
FIG. 8 is a flow diagram illustrating a method for processing queries in accordance with an embodiment.

FIG. 8 is a flow diagram illustrating a method for processing queries in accordance with an embodiment. As discussed earlier, at step 502, the first query pertaining to the primary theme is received at the proxy server 202.

At step 802, the request to generate one or more secondary queries associated with one or more plausible secondary themes is received by the theme server 204 from the proxy server 202. As explained earlier, the request may include the first query or keywords extracted from the first query.

At step 804, the one or more secondary queries are obtained at the proxy server 202 from the theme server 204. In response to the request, the one or more secondary queries are generated at the theme server 204 and returned to the proxy server 202. This is further explained in conjunction with FIG. 2, FIG. 3, and FIG. 4. Further, at step 506, the first query and the one or more secondary queries are submitted to the search engine 114.

Figure 9:
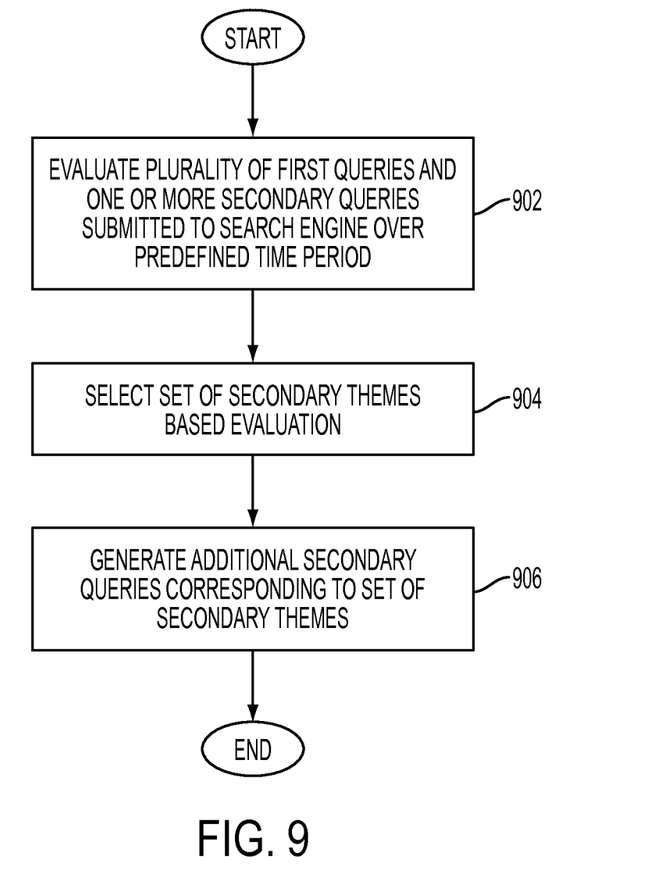
FIG. 9 is a flow diagram illustrating a method for generating additional secondary queries in accordance with an embodiment.

FIG. 9 is a flow diagram illustrating a method for generating additional secondary queries in accordance with an embodiment.

At step 902, a plurality of the first queries and the one or more secondary queries submitted to the search engine 114 are evaluated over the predefined time period (e.g., 12-24 hours). In an embodiment, the evaluation is performed at the proxy server 202 by the evaluation module 308. Each query (e.g., the plurality of the first queries) submitted by users and/or each webpage accessed are grouped according to coherent and distinct primary themes (those explored by users in the organisation) by the proxy server 202. To do so, the proxy server 202 uses the categorization techniques implemented by the theme server 204 (refer to FIG. 4). Once the categorization is performed, in an embodiment, the number of queries submitted to the search engine 114 related to each primary theme is counted by the evaluation module 308 over the predefined time period. In another embodiment, the number of web-links accessed related to each true theme is also counted by the evaluation module 308 over the predefined time period.

In addition, the number of queries submitted to the search engine 114 related to the plausible secondary themes is counted by the evaluation module 308 over the predefined time period. In another embodiment, the number of web-links accessed related to plausible secondary themes is also counted by the evaluation module 308 over the predefined time period.

For the predefined time period, primary themes explored by the users, hereinafter referred to as $P_{MAX}$, (e.g., generally they cover the specific work done in different groups of the organization 104) are evaluated by the evaluation module 308. In an embodiment, based on the evaluation, a mean number of queries submitted for each of primary themes are determined. In another embodiment, a mean number of web-links accessed for each of primary themes are determined.

The plausible secondary themes used over the predefined time period are also evaluated by the evaluation module 308. Based on the evaluation of the plausible secondary themes, a set of plausible secondary themes are selected by the evaluation module 308, at step 904. In an embodiment, the set of plausible secondary themes includes the plausible secondary themes for which the greatest numbers of secondary queries are submitted. In another embodiment, the set of plausible secondary themes includes the plausible secondary themes for which the greatest numbers of web-links are explored by the result processing module 306. In an embodiment, the number of plausible secondary themes in the set of plausible secondary themes (hereinafter referred to as $S_N$) includes not more than three times the total number of primary themes explored by the users. Hence, $S_N <= P_{MAX}*3$.

The evaluation module 308 compares the number of secondary (e.g., fake) queries generated for each plausible secondary theme in the set of plausible secondary themes (hereinafter referred to as 'Q1') with the mean number of queries submitted for all primary (e.g., true) themes (hereinafter referred to as 'Q2'). In another embodiment, the evaluation module 308 can also compare the number of result pages accessed for each plausible secondary theme in the set of plausible secondary themes with the mean number of result pages accessed for primary (e.g., true) themes. If Q1<Q2, then the evaluation module 308 sends a request to the theme server 204 for generating (Q2−Q1) additional secondary queries in each secondary (fake) theme in the set of plausible secondary themes. The additional secondary queries are then generated (at step 906) by the theme server 204 and returned to the proxy server 202. The additional secondary queries are then submitted to the search engine 114 by the query submission module 304. In an embodiment, over the predefined time period, the additional queries are generated such that the same number of queries/pages is generated/accessed for each plausible secondary (e.g., fake) theme as the mean number of queries/pages submitted/accessed for all primary (e.g., true) themes (Q2). Once, the additional queries are generated, the number of secondary queries (e.g., fake or false queries) in each plausible secondary theme becomes equivalent to the mean number of queries submitted for all primary (e.g., true or real) themes. Thus, any external statistical analysis on the queries originating from the organization 104 results in identification of various clusters of queries, where each cluster may belong to the primary theme or one of the secondary themes. Thus, the themes explored by the employees of the organization 104 are hidden among the secondary themes to resist to the external statistical analysis.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks, such as, the steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the disclosure. The software may also include modular programming in the form of object-oriented programming. The processing of input data by the processing machine may be in response to user commands, results of previous processing or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

The method, system, and computer program product, as described above, have numerous advantages. Some of these advantages may include, but are not limited to, obfuscating of the themes explored by the user and hence the business activity of the organization or the user. Fake queries pertaining to the fake themes are submitted along with the user queries, so as to hide the real search themes (e.g., themes explored by the user) among the fake themes. Further, the result pages corresponding to the fake queries are explored as if they were explored by humans. Further, as compared to the conventional techniques where random queries are submitted to the search engine, the query processing system disclosed in various embodiments submits secondary queries, each of which are generated for a plausible secondary themes. Further, in an embodiment, the number of secondary queries submitted for each plausible theme of the set of plausible themes is equivalent to the mean number of queries submitted for the plurality of primary (e.g., actual or true) themes explored by the user. Thus, the external statistical analysis on the queries originating from an organization over the predefined period of time results in identifying clusters of queries where each cluster relates to a valid theme. Hence, the various statistical categorization tools at the search engine or over the network will be unable to correctly determine the primary theme/true theme explored by the users as some of the themes are fake themes.

Various embodiments of the method and system for processing search queries have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented method over a network for processing queries comprising:
   receiving, by a computer, a first query pertaining to a primary theme from a user;
   generating, by a query generation module of the computer, one or more secondary queries, each of the one or more secondary queries being associated with a secondary theme; wherein the secondary theme is different from the primary theme;
   submitting, by the computer, the first query along, with the one or more secondary queries to a search engine such that a statistical analysis of the first query and the one or more second queries submitted to the search engine would be unable to detect that the primary theme is associated with the first query received from the user; and
   displaying, to the user, search results from the first query pertaining to the primary theme.

2. The computer implemented method of claim 1 further comprising selecting, by the computer one or more secondary themes from a plurality of secondary themes.

3. The computer implemented method of claim 2 further comprising generating, by the computer, the one or more secondary queries by selecting one or more keywords associated with the selected one or more secondary themes.

4. The computer implemented method of claim 1 further comprising receiving, by the computer, result pages corresponding to each of the first query and the one or more secondary queries from the search engine.

5. The computer implemented method of claim 4 further comprising sending, by the computer, the result pages corresponding to the first query to a computing system, wherein the first query is received from the user through the computing system.

6. The computer implemented method of claim 4 further comprising processing, by the computer, the result pages corresponding to the one or more secondary queries by exploring one or more web-links present in the result pages corresponding to each of the one or more secondary queries.

7. The computer implemented method of claim 1 further comprising evaluating, by the computer, queries pertaining to a plurality of primary themes and the one or more secondary queries submitted to the search engine over a predefined time period.

8. The computer implemented method of claim 7 further comprising selecting, by the computer, a set of secondary themes from a plurality of secondary themes based on the evaluation.

9. The computer implemented method of claim 8 further comprising generating, by the computer, additional secondary queries corresponding to the selected set of secondary themes, wherein the secondary queries for each secondary theme of the set of secondary themes are equivalent to a mean number of queries pertaining to the plurality of primary themes.

10. A system for processing queries comprising:
    a proxy server configured for receiving a first query pertaining to a primary theme from a user;
    a theme server configured for:
      receiving a request for generating one or more secondary queries;
      generating, in response to the request, the one or more secondary queries by a query generation module based on one or more secondary themes from a plurality of secondary themes and one or more keywords pertaining to the one or more secondary themes, wherein the one or more secondary themes are different from the primary theme;
      sending the generated one or more secondary queries to the proxy server;
      wherein the proxy server is further configured for submitting the first query along with the one or more secondary queries to a search engine such that a statistical analysis of the first query and the one or more second queries submitted to the search engine would be unable to detect that the primary theme is associated with the first query received from the user; and
    a computer with a display configured for displaying search results from the first query pertaining to the primary theme to the user.

11. The system of claim 10 further comprising a database for storing the plurality of secondary themes and keywords pertaining to each of the plurality of secondary themes.

12. The system of claim 10, wherein the database further comprises additional information comprising, at least one of a list of a plurality of the primary themes, keywords pertaining to each of the plurality of the primary themes, or one or inure named entities associated with the plurality of the primary themes and the plurality of secondary themes.

13. The system of claim 10, wherein the proxy server is further configured for evaluating queries pertaining to a plurality of primary themes and the one or more secondary queries submitted to the search engine over a predefined time period.

14. The system of claim 13, wherein the proxy server is further configured for selecting a set of secondary themes from the plurality of secondary themes based on the evaluation.

15. The proxy server of claim 14, wherein the proxy server is further configured for sending a request to the theme server for generating additional secondary queries corresponding to the set of secondary themes, wherein the secondary queries for each secondary theme of the set of secondary themes are equivalent to a mean number of queries pertaining to the plurality of primary themes.

16. A computer implemented method over a network for processing queries comprising:

receiving, by a computer, a first query pertaining to a primary theme from a user;

generating, by a query generation module of the computer, one or more secondary queries, each of the one or more secondary queries being associated with a secondary theme, wherein the secondary theme is different from the primary theme; and submitting the first query along with the one or more secondary queries to a search engine;

submitting a plurality of additional queries associated with the primary theme to the search engine;

determining, by the computer, that a number of queries associated with the primary theme submitted to the search engine is greater than a number of queries associated with the secondary theme submitted to the search engine; and submitting at least one additional secondary query associated with the secondary theme to the search engine based on the determination that the number of queries associated with the primary theme submitted to the search engine is greater than the number of queries associated with the secondary theme submitted to the search engine; and displaying, to the user, search results from the first query received from the user pertaining to the primary theme.

17. The computer implemented method of claim 16, wherein the number of secondary queries associated with the secondary theme submitted to the search engine is equivalent to a number of queries associated with the primary theme submitted to the search engine over a predefined time period.

* * * * *